Patented Sept. 14, 1937

2,092,777

UNITED STATES PATENT OFFICE 2,092,777

DRIED FRUIT PROCESSING

Henri Daniel Rey, Papeete, Tahiti, assignor to The Anglo California National Bank of San Francisco, trustee, San Francisco, Calif., a corporation No Drawing. Application September 12, 1936, Serial No. 100,559

10 Claims. (Cl. 99—104)

This invention relates to dried fruits and has for its object an improved treatment of such fruits, particularly dried prunes and dried drupaceous fruits, though applicable to most all dried fruits, whereby the fruits are rendered extremely soft and pliable at all points, without hard spots or ends, the juices or syrups remaining in the dried fruits are worked or distributed evenly throughout the flesh of the fruit bodies, and in case of prunes and other drupes the pits may with the complete process be substantially loosened from the flesh so as to be very easy to remove when the fruits are eaten.

This application is a continuation in part of my copending application filed under Serial No. 86,417 on date of June 20, 1936, and which is to be superseded by the present case.

The process represents an improvement over the methods of softening dried fruits described in my copending applications for United States patents filed under numbers and dates as follows:

1. 68,885, filed March 14, 1936.
2. 73,699, filed April 10, 1936.
3. 82,833, filed June 1, 1936.
4. 82,835, filed June 1, 1936.
5. 82,834, filed June 1, 1936.

In the disclosures of the above mentioned cases, it was shown that if dried fruits, such as are commercially available on the market, (and which are generally more or less hard in spots, and some pieces so hard that they can be chewed only with difficulty), were subject to certain mechanical processes for repeatedly working or kneading the flesh of the bodies, the residual moisture or juices still in some parts of the flesh would be distributed throughout the same, the flesh would be softened all over, and the pits if any, would become loosened or detached from their natural bond with the interior of the fruit.

The several copending applications referred to had to do each with a particular method and apparatus for applying the mechanical kneading action as follows, thus in:—

Case #1 covered generally the application of mechanical kneading and working of the fruit bodies till soft and pliable.

Case #2, the fruit bodies were passed along in single file while subject to percussive blows or hammering from all sides.

Case #3, the fruit bodies were rolled and dropped with heavy balls to knead the bodies into the desired condition.

Case #4, the fruit bodies were subjected to repeated blows of a high speed paddle wheel, and impact against a wall against which they were thrown.

Case #5, the fruit bodies were subject to manipulation with opposed rubber nubs, as by passing repeatedly between rollers studded with resilient nubs, and which speedily worked the bodies to soft pliable condition.

The present improvement is an additional treatment applicable to any of the above mechanical manipulatory methods, as well as of value apart therefrom in some cases, and was evolved in my endeavor to apply the methods also to low grade dried fruits, especially low grade dried prunes which generally require too long a mechanical kneading treatment to render all of the bodies uniformly soft, especially such grades as where the dried fruit bodies were shriveled up into tough leathery or woody condition encrusted outwardly with dried fruit sugars, etc.

Preliminary softening steps were tried on such fruit bodies such as soaking in water and then partially drying before subjecting to the mechanical manipulatory treatment. Also slight steaming was tried, either before or during the mechanical treatment, however, such treatment, while of some value, generally tended to soften the outer layers of the fruit, or its skin, more than any other part with the result of making the skins tender and more subject to surface abrasions and noticeable injuries and separations. After considerable experimenting along this line, I finally discovered that if the dried fruit, even if a low inferior grade, hard and tough and with the whitish deposit of fruit sugars and what not over their surfaces, were simply heated for a few minutes to a temperature running from about 200 to 500 degrees Fahrenheit, or long enough to permit the heat to penetrate through the fruit bodies to the pits, if any, the whitish deposits would all disappear and the internal hardened syrups, sugars and residual juices would apparently melt so that the fibers were at once materially softened and the bodies rendered much more amenable, especially while hot to the mechanical manipulatory treatment of any of the copending applications outlined, particularly the nubbing treatment of Case #5, so that a very fine soft and pliable product resulted even from low grade fruit, and the product, if dried prunes, showed a fine black smooth outer surface free from deposit.

The preliminary heat treatment can be applied to the fruit bodies in any suitable way—in test quantities in a pan on a stove, with the pan preferably covered and continually shaken to distribute the heat evenly, or in larger quantities in a revolving heated drum through which the fruit may pass. For dried prunes it will take about 5 or 6 minutes at 200°, or about 2 to 3 minutes at 500° for the heat to penetrate through the bodies. I have also found that a very small quantity of dry steam may be introduced into the hot preheater, if not more than enough to insure very slight humidity to the hot air in the heating chamber, but not enough to induce any appreciable steaming effect, though for most samples of commercially dried fruits tried out, even extremely poor grades, the plain dry heat treatment without any extraneous moisture being added, though it does drive off some of the moisture content of the fruit, temporarily softens the fruit bodies and gives just the result desired so that the fruit may at once be passed through the mechanical manipulatory steps until quite permanently soft and unctuous throughout and with little danger of surface injuries. The preheated dried fruit may be permitted to slightly cool before subjecting to the mechanical treatment, but better results are obtained by proceeding with the mechanical kneading at once.

For good grades of dried fruits, the process may terminate with the mechanical kneading step, but I have further found that if dried fruit is substantially dry heated through and through as above outlined, even without the mechanical kneading step its fibers seem to loosen up and expand so that if, while hot, it is passed into boiling water for a short while, it will more quickly and deeply absorb some of the liquid than would otherwise be the case, and also without undue disintegrating action on the outer skins as otherwise occurs, and the fruit, particularly prunes, thus treated will be softer all over than common hot water or steamed prunes of the same water content. The fruit may be removed from the boiling water, drained and at once packed while hot. The temperature most suitable for the dry heat treatment will depend on the nature of the dried fruit being treated and the amount of moisture it contains, but for ordinary dried prunes which are quite hard, it should range from about 350 to about 450 degrees F.

Dried, drupaceous fruits, treated by the dry preheating process followed with boiling water as described, do not have their pits loosened, as would be the case where the mechanical kneading step is also applied, but are otherwise of extraordinary tender texture.

This final boiling water treatment may be applied to the mechanically kneaded fruit by dropping it directly from the kneading treatment while still quite hot, into the boiling water, though on account of the bodies being so soft, the time of immersion is somewhat reduced, this being gaged by the total amount of moisture the fruit is to have when packed, and which, for prunes and other drupaceous fruits, is preferably about 25% by weight.

Having thus described my improved process of treating dried fruits to more fully realize the benefits of subsequent mechanical manipulation, as well as to make it possible to produce a satisfactory product from extra dry, tough fruits, or low grade fruits, not previously amenable to mechanical manipulation, what I claim is:

1. The process of treating dried fruit which comprises subjecting the fruit bodies to the influence of substantially dry heat until the heat has well penetrated into the bodies, and thereafter while the bodies are still hot subjecting them to the action of boiling water, then draining and packing the fruit.

2. The process of treating dried fruit which comprises subjecting the fruit bodies to the influence of substantially dry heat until the heat has well penetrated into the bodies, and thereafter while the bodies are still hot subjecting them to the action of boiling water until the desired amount of water has been absorbed, then draining and packing the fruit while hot.

3. The process of treating dried fruit which comprises subjecting the fruit bodies to the influence of substantially dry heat at from 200° to 500° F. until the heat has well penetrated into the bodies, and thereafter while the bodies are still hot subjecting them to the action of boiling water, then draining and packing the fruit.

4. The process of treating dried fruit which comprises subjecting the dried fruit bodies to the influence of substantially dry heat until the heat has well penetrated the bodies and subjecting the fruit bodies to mechanical manipulation, as by mechanical kneading, rolling, percussion, squeezing or the like from various directions until the fruit bodies are uniformly soft and pliable while preserving the individuality of the fruit bodies.

5. The process of treating dried fruit which comprises first subjecting the dried fruit bodies to the influence of substantially dry heat at over 200° F. until the heat has well penetrated the bodies and thereafter subjecting the fruit bodies to mechanical manipulation, as by mechanical kneading, rolling, percussion, squeezing or the like from various directions until the fruit bodies are uniformly soft and pliable while preserving the individuality of the fruit bodies.

6. The process of treating dried fruit which comprises first subjecting the dried fruit bodies to the influence of substantially dry heat at over 200° F. until the heat has well penetrated the bodies and thereafter subjecting the hot fruit bodies to mechanical manipulation, as by mechanical kneading, rolling, percussion, squeezing or the like from various directions until the fruit bodies are uniformly soft and pliable while preserving the individuality of the fruit bodies.

7. The process of treating dried fruit which comprises first subjecting the dried fruit bodies to the influence of substantially dry heat at over 200° F. until the heat has well penetrated the bodies and thereafter when the fruit has cooled somewhat subjecting the fruit bodies to mechanical manipulation, as by mechanical kneading, rolling, percussion, squeezing or the like from various directions until the fruit bodies are uniformly soft and pliable while preserving the individuality of the fruit bodies.

8. The process of treating dried fruit which comprises subjecting the dried fruit bodies to substantially dry heat of from about 200 to 500 degrees Fahrenheit for a time period to penetrate the bodies, and thereafter subjecting the bodies to mechanical manipulation, as by mechanical kneading, rolling, percussion, squeezing or nubbing, from various directions until the fruit bodies are uniformly soft and pliable while preserving the individuality of the fruit bodies.

9. The process of treating dried fruit which comprises subjecting the dried fruit bodies to substantially dry heat of from about 200 to 500 degrees Fahrenheit for a time period to penetrate the bodies, and thereafter subjecting the bodies to mechanical manipulation, as by mechanical kneading, rolling, percussion, squeezing or nubbing, from various directions, until the fruit bodies are uniformly soft and pliable while retaining the individuality of the bodies, and thereafter immersing the fruit bodies in hot water until substantial absorption has taken place only, then draining and packing the fruit.

10. The process of treating dried fruit which comprises subjecting the dried fruit bodies to substantially dry heat of from about 200 to 500 degrees Fahrenheit for a time period to penetrate the bodies, and thereafter subjecting the bodies to mechanical manipulation, as by mechanical kneading, rolling, percussion, squeezing or nubbing, from various directions until the fruit bodies are uniformly soft and pliable while retaining the individuality of the bodies, and thereafter immersing the fruit bodies in boiling water for from 1 to 6 minutes until the water content of the bodies is not over about 25%, removing the fruit and draining the superfluous water therefrom and packing the fruit.

HENRI DANIEL REY.